United States Patent
Freeman (10) Patent No.: US 6,700,573 B2
(45) Date of Patent: Mar. 2, 2004

(54) METHOD FOR RENDERING REALISTIC TERRAIN SIMULATION

(75) Inventor: Kyle G. Freeman, Agoura, CA (US)

(73) Assignee: NovaLogic, Inc., Calabasas, CA (US)

( * ) Notice: Subject to any disclaimer, the term of this patent is extended or adjusted under 35 U.S.C. 154(b) by 232 days.

(21) Appl. No.: 10/007,565

(22) Filed: Nov. 7, 2001

(65) Prior Publication Data

US 2003/0085896 A1 May 8, 2003

(51) Int. Cl.⁷ ............................................. G06T 15/00
(52) U.S. Cl. ....................................................... 345/422
(58) Field of Search ................................ 345/419, 421, 345/422, 427, 428, 619, 625

(56) References Cited

U.S. PATENT DOCUMENTS

| | | | |
|---|---|---|---|
| 4,583,185 A | 4/1986 | Heartz | 345/421 |
| 4,586,038 A | 4/1986 | Sims et al. | 345/586 |
| 4,609,917 A | 9/1986 | Shen | 345/421 |
| 4,721,952 A | 1/1988 | Huber | 345/419 |
| 4,752,828 A | 6/1988 | Chapuis et al. | 348/580 |
| 4,775,946 A | 10/1988 | Anjyo | 345/419 |
| 4,791,579 A | 12/1988 | Kranitzky | 345/420 |
| 4,855,937 A | 8/1989 | Heartz | 345/421 |
| 4,974,177 A | 11/1990 | Nishiguchi | 345/582 |
| 5,179,638 A | 1/1993 | Dawson et al. | 345/482 |
| 5,243,665 A | 9/1993 | Maney et al. | 382/152 |
| 5,307,450 A | 4/1994 | Grossman | 345/423 |
| 5,317,689 A | 5/1994 | Nack et al. | 345/505 |
| 5,448,686 A | 9/1995 | Borrel et al. | 345/420 |
| 5,550,959 A | 8/1996 | Freeman | 345/427 |
| 5,613,051 A | 3/1997 | Iodice et al. | 345/428 |
| 5,616,079 A | 4/1997 | Iwase et al. | 463/32 |
| 5,666,475 A | 9/1997 | Salesin et al. | 345/428 |
| 5,699,497 A | 12/1997 | Erdahl et al. | 345/428 |
| 5,864,342 A * | 1/1999 | Kajiya et al. | 345/418 |
| 5,877,779 A | 3/1999 | Goldberg et al. | 345/538 |
| 5,986,666 A * | 11/1999 | Couvet et al. | 345/420 |
| 6,020,893 A | 2/2000 | Freeman | 345/428 |
| 6,023,278 A * | 2/2000 | Margolin | 345/419 |
| 6,275,234 B1 | 8/2001 | Iwaki | 345/428 |
| 6,362,818 B1 * | 3/2002 | Gardiner et al. | 345/421 |

FOREIGN PATENT DOCUMENTS

| | | |
|---|---|---|
| EP | 0 337 338 | 10/1989 |
| WO | WO 98/47107 | 10/1998 |

OTHER PUBLICATIONS

Foley et al., "Fundamentals of Interactive Computer Graphics", Jul. 1984, pp. 6, 267–272.
Foley et al., "Computer Graphics Principles and Practice", Second Edition, Nov. 1992 pp. 672, 835, 836.
Satoh et al., "Allowance Delay Time of Images with Motion Parallax, and High Speed Image Generation," SPIE, pp. 1014–1021, vol. 1606 Visual Communications and Image Processing '91: Image Processing.

\* cited by examiner

*Primary Examiner*—Pru K. Nguyen
(74) *Attorney, Agent, or Firm*—Fulwider Patton Lee & Utecht, LLP (57) ABSTRACT

A technique for the realistic simulation of visual scenes uses voxels generated from positional and elevational data combined with a stored color map to generate vertex and triangle data that is used by an accelerator card to render a visual scene on a display device. In this manner, the invention provides rendering efficiency and speed for highly detailed visual scenes while preventing overdraw.

3 Claims, 6 Drawing Sheets

METHOD FOR RENDERING REALISTIC TERRAIN SIMULATION

FIELD OF THE INVENTION

This invention generally relates to a technique for the generation of images on a display device, and more particularly to real-time computer simulation of visual images of perspective scenes such as landscapes and seascapes.

BACKGROUND OF THE INVENTION

The principal application area for computer image generation has been that of visual training and/or entertainment simulators which present scenes to an operator, usually a trainee or game player, that allows the operator to practice some task such as flying an airplane, helicopter or space vehicle. In a flight simulator, a three-dimensional model of a desired "gaming area", called a visual data base, is prepared and stored in memory of a computer. Typically, the visual data base is an array of points, generally in the form of Cartesian coordinates. In visual data bases of this type, the z component associated with each x,y position may be an elevation value, or some other attribute required to produce a visually pleasing scene, such as color, hazing, viscosity, or the like.

In its usual configuration, the simulator combines an image generator, typically a computer, with a display device such as a cathode ray tube (CRT) or liquid crystal display (LCD). The image generator converts the three-dimensional visual data base into a two-dimensional scene for display on the display device. The generated imagery is meant to be representative of the true scenes that the operator would see if the operator were actually performing the task being simulated. The generation of display images is said to be in "real time" if the images are updated fast enough to provide the operator with a sense of motion.

Real-time generation of visual scenes is usually a compromise between realism and the cost of the image generator and the display device. Generation of visually pleasing and realistic appearing images requires the manipulation of substantial amounts of data by the image generator. This manipulation typically requires a high speed processor and a large amount of associated memory for storing both the raw data and the rendered image. In the past, various techniques have been employed to accelerate processing of the visual data during scene rendering, usually at the cost of reduced resolution and realism. Many prior techniques rendered the terrain of the gaming area using so-called polygonal projections. This type of visual scene rendering, while adequate for simple games, or for games where the focus of attention is not on the overall visual scene, lacks the realism important to providing the user with a true simulation of the operation of the aircraft or vehicle simulated even where the data comprising the polygonal projections is processed by a dedicated graphic accelerator card. Such realism is particularly important where the operator of the game is engaging in simulated combat, such as in a dog fight or tank battle. The simulation has two parts: 1) the operation model that simulates the actual operation of the plane or vehicle in response to operator inputs. For example, in a flight simulation, the operator must be presented with a flight model that mimics, as closely as possible, the actual flight characteristics of the plane being simulated. The flight model must present the operator with a realistic flying experience, mimicking the responses of the aircraft in a wide variety of situations.

Typically, a flight model must provide a realistic simulation of the aircraft's response to changes such as operator inputs controlling climb, descent, banking for maneuvering, as well as determining whether the aircraft is in level flight or landing or taking off. While the processor is controlling the flight model, it must also associate the movements of the aircraft with motion over the ground. Thus, the processor must also render and update a visual scene representing a simulated "world" that is experienced by he operator as the operator "flies" the aircraft through the simulation.

Rendering a realistic visual scene at a rate that provides a visually pleasing and realistic experience places a heavy load on the processor. This, it is important to optimize the rendering of the scent to reduce processor load and data transmittal. In these simulations much of the action involves use of the features of the terrain, either for purpose of evasion or to lend difficulty to enemy detection and attack.

One prior approach forgoes the simplicity of polygonal feature rendering and uses a technique based on volume elements. In this approach, the visual data base contains elevational and color data associated with each point in an array of points defining a gaming area. The location of the operator in relation to the coordinates of the visual data base is determined from the operator's starting position in the gaming area and the operator inputs. The terrain generator uses this information to divide the area of the visual scene visible to the operator into a number of cross-sections oriented perpendicular to the line of sight of the operator. The horizontal scale of the cross-sections changes proportionately to the distance from the operator, as does the vertical scale of the terrain features being displayed. The horizontally and vertically scaled visual scene is generated one cross-section at a time until the entire scene is rendered, and then displayed. Alternatively, each point on a series of individual cross-sections can be generated, stepping backwards or forwards through the cross-sections.

Additionally, game developers were constrained by the relatively slow processing speed of available processors incorporated in computers and gaming devices, slow data transfer rates across the internal bus of the computer or gaming device, and the amount of rapidly addressable random access memory available for storing the data comprising the visual image to be displayed. With the advent of 4x86 and other advanced processors, VESA and PCI bus architecture and the availability of inexpensive memory, developers are now able to utilize more sophisticated data retrieval and display techniques without sacrificing execution speed of the simulation.

Recently, dedicated hardware known as graphic accelerator cards have been developed for use with personal computer systems. These cards are designed to take much of the graphical processing load from the central processor of the system. Because they are designed to deal only with the type of data necessary to render graphical scenes, graphic accelerator cards are able to complete the mathematical processes necessary to render graphics from polygonal data sets much more rapidly than previous systems.

What has been needed is a technique for real-time generation of visual displays without sacrificing realism or requiring expensive hardware that utilizes the features of graphic accelerator cards to perform polygon calculations that also include the benefits inherent in rendering terrain data using voxels, or three dimensional position and elevational data.

SUMMARY OF THE INVENTION

The invention provides a unique real-time display of visual scenes rendered by a computer in accordance with programming commands to provide a realistic and visual pleasing simulation. The invention provides this real-time display of visual scenes by rendering the scenes by altering the scaling of the visual scenes in accordance with the distance of a virtual observer from features in the visual scene to be displayed. The present invention accomplishes the more realistic rendering of visual scenes by using elevational databases whose resolution is varied dependant upon the calculated distance of the observer to features that are to be displayed. The present invention then combines the rendered visual scene with textural information accessible by a graphic accelerator card to provide a highly detailed realistic three dimensional scene in real time.

In one embodiment, the present invention generates data representing a visual scene using a rendering engine designed to utilize a three dimensional database containing positional and elevational data. This data includes coordinate data establishing the location of each pixel in a visual scene, as well as data representing the distance of the pixel from an observer. This data is used to generate a set of vertexes and triangles that are used by a graphic accelerator card to apply a texture to the data and render the visual scene for display on a display device.

In another embodiment, the present invention provides a voxel generator for rendering a visual scene that outputs a vertex list directly to the accelerator card. The accelerator card then determines a list of triangles associated with the data in the vertex list and using the vertex list and triangle list, renders the visual scene for display on the display device.

In still another embodiment, the present invention includes a voxel generator, a vertex generator and a triangle generator. The vertex generator provides a list of vertices generated from data received from the voxel generator, and the triangle generator provides a list of triangles determined from the list of vertices and data from the voxel generator.

In a further embodiment, the present invention loads a color map into a buffer of the memory of an accelerator card, and generates a matrix of x and y coordinates for pixels to be displayed, and also stores an adjusted distance for each pixel from an observer in a Z-buffer. A vertex generator scans the rows of data contained in the Z-buffer to determine if there are any sudden changes or discontinuities indicating edges. If an edge is found, the generator creates a first screen vertex using the near screen position in the Z-buffer and a second screen vertex using the far screen position in the Z-buffer. These vertices are mapped onto the color map and stored in a vertex buffer. The generator then determines if there is sufficient slope between the vertices to create a contour vertex. If there is sufficient slope, the generator creates a contour vertex using the far screen position in the Z-buffer. This vertex is mapped onto the color map and stored in the vertex buffer. Once the entire screen has been scanned and vertices determined, a triangle generator scans the rows of the vertex buffer, comparing two adjacent rows of vertices at a time. As each pair of vertices is compared, the triangle generator determines a triangle connecting the vertices having the smallest change or slope of the diagonal, and stores the triangle in a triangle buffer. Once the entire vertex buffer has been scanned, the data contained in the vertex buffer and the triangle buffer are used to render the visual scene on a display device.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

The real-time generation of perspective scenes reflective of a virtual observer's movement through given terrain is a critical need for aviation and ground simulation trainers and many types of computer games. In order to minimize the number and complexity of the required calculations, the present invention provides a method for generating perspective scenes using data bases such as the elevation grid data bases produced by the Defense Mapping Agency. Such data bases are described more fully in U.S. Pat. No. 4,583,185 to Robert A. Heartz.

The technique according to the present invention may be illustrated with reference to FIGS. 2–5. Observer (virtual) location and heading with respect to the elevation data base are obtained. In its simplest embodiment, the scene is generated by sequentially generating a series of "slices" or cross-sections at ninety degrees to the observer's line of sight. Adjustment is made for the observer's altitude. Each cross-section is horizontally scaled to render the observer's field of view, and vertically scaled to render perspective. For each point in a given cross-section, a vertical line is drawn to the respective scaled height. After a pre-selected number of cross-sections have been generated, the scene is displayed.

Figure 3:
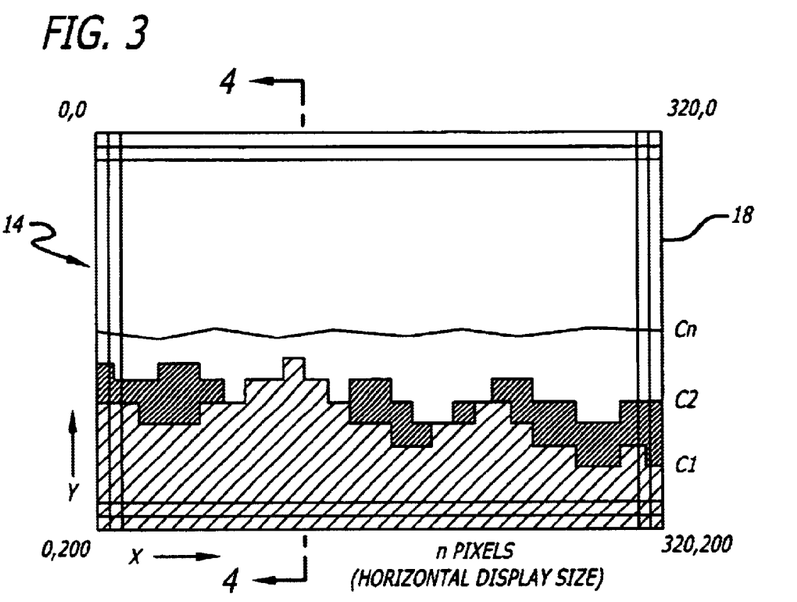
FIG. 3 is a representation of the gaming area of FIG. 2 as seen by a game player showing the terrain of the gaming area rendered in perspective.

An alternative approach, while consuming more computer resources, but more visually pleasing, is to use a technique similar to the "ray casting" approach commonly used for generating polygon graphic images. The method of the present invention, however, differs from the ray casting technique in that images are generated using volume elements, or voxels, rather than polygon constructs to generate the features of the terrain comprising the gaming area. In general, a video display is comprised of a number of pixels arranged in an array of columns and rows. The number of columns and rows is dependent on the resolution of the video device, which is dependent on the amount of video memory, commonly called a video buffer, available in the computer. A typical arrangement, for example, of a video display 18 operating using VGA Mode 13h is 320×200, or 64,000 pixels is illustrated by FIG. 3. In this resolution, the display 18 consists of an array of pixels 320 columns wide and 200 rows high. In this arrangement, each pixel can be represented by a unique combination of values for X and Y. For example, the pixel at the top left corner of the display of FIG. 3 is represented by the coordinates (0, 0), while the pixel located at the bottom right corner of the display is represented by the coordinates (320, 320). Other resolutions, such as 1048×768, with an increased number of pixels comprising the display are also possible.

It will be obvious to one skilled in the art that the area displayed on the display 18 is only a small portion of the gaming area that is available for use in the simulation. The size of the gaming area is limited only by considerations of data base size, memory storage, and processor speed. All of these variables can be manipulated by a simulation designer to enhance the realism of the simulation.

Figure 1:
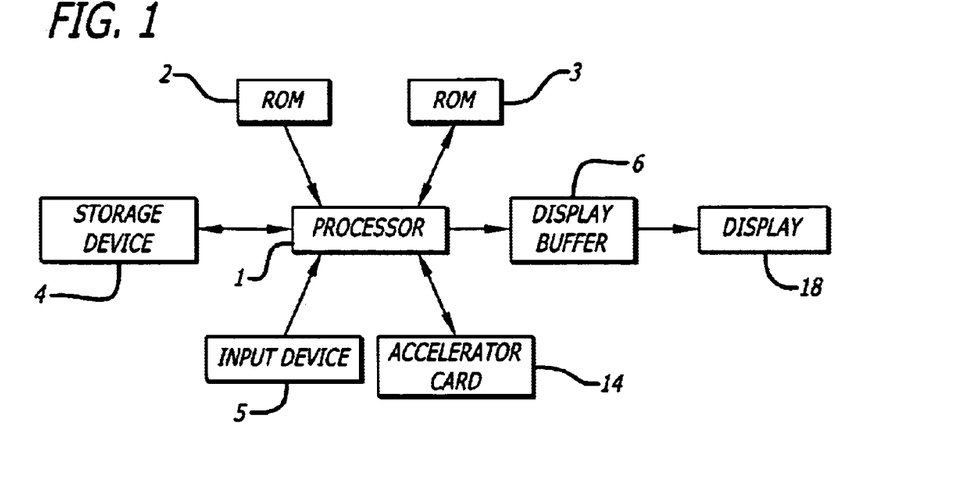
FIG. 1 is a block diagram of a general purpose computer system that is programmed by the techniques of the present invention to render the terrain of a simulation.

Referring now to FIG. 1, an exemplary computer system on which the software techniques of the present invention runs is described. Generally, the terrain rendering techniques of the present invention may be implemented by a general purpose computer programmed to carry out the specific methods set forth in reference to the processes set forth in FIGS. 5A and 5B through FIG. 7. Typically, such a general purpose computer comprises a processor 1 which is connected to either or both a read-only-memory 2 and/or a random-access-memory 3. The read-only-memory 2 stores program instructions and data of a permanent nature. The random-access-memory 3 is used to store program instructions and data temporarily in response to commands from the processor 1. For example, the random-access memory 3 may store particular programs or segments of programs used to carry out specific functions, the processor 1 being response to the stored programs to carry out the functions of the programs as if the processor were a hardwired, dedicated device. Additionally, the random-access memory 3 may be used to store current data or intermediate results in a manner well known in the art. In a preferred embodiment, the processor is an Intel x386, x486, Pentium or similar processor and the random-access-memory is typically 16 megabytes or more of dynamic random-access memory or the equivalent.

The computer system also has one or more storage devices 4, such as a hard disk drive, CD-ROM, floppy drive or other storage media operably connected to the processor. The storage device 4 may contain programs that are accessed by the processor to program the process to perform specific functions as well as data to be used by programs, such as the present invention.

The processor 1 receives operator input from one or more input devices 5, such as a keyboard, joystick or mouse. Acting on the operator input, the processor 1 performs various operations and writes the output of such operations to various devices, such as the display buffer 6, also called video memory. The contents of the display buffer 6 or video memory are written to the display 18, forming an image on the display 18.

Many computers now also include dedicated hardware known as graphic accelerator cards 14. These cards are typically provided with sets of data, such as vertex lists, triangle lists and other information needed to rapidly calculate and render polygon structures which may then be written to buffer 6 for display on display 18. While accelerator card 14 is shown connected to processor 1, it is understood that the various components of the general computer are linked to the processor 1 using a bus, various configurations of which are well known to those skilled in the art. Thus, while display buffer 6 is not shown connected to of accelerator card 14, it will be understood that there are configurations where display buffer 6 receives data directly from accelerator card 14 for use in rendering a scene on the display 18.

Various programming languages for programming the functions and features of accelerator card 14 are well known by those skilled in the art of developing and publishing software that is capable of rendering three dimensional images to a video screen. For example, accelerator cards may be programmed using DirectX or Open GL programming languages.

Figure 2:
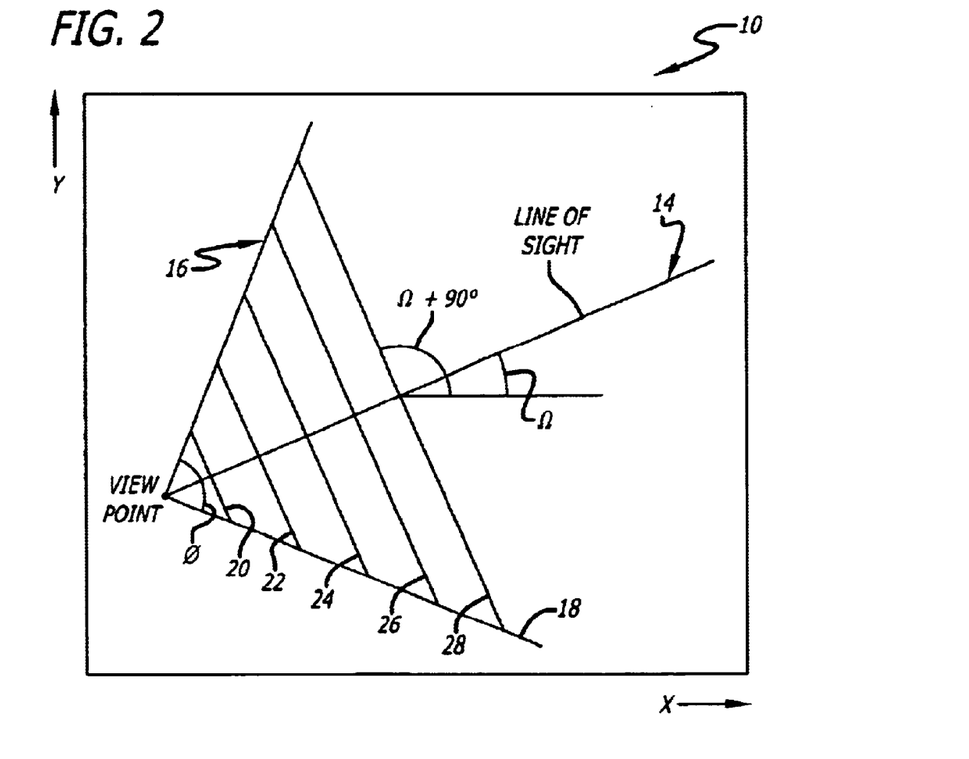
FIG. 2 is a representation in plan view of a gaming area of the simulation, representing a virtual observer's location and heading therein.

Referring now to FIG. 2, a gaming area 10 represented by a visual data base is shown. The gaming area 10 comprises the background, or terrain, in which the simulation occurs. In a typical simulation, the portion of the gaming area 10 visible on the screen at any particular time is only a small portion of the total gaming area 10 that is stored as an array of discrete points in the memory of the computer or electronic gaming device on which the simulation is operated. As shown in FIG. 2, any location in the entire gaming area may be represented by the Cartesian coordinates X and Y. The gaming area is stored in the storage device of the computer or gaming device as strings of data, each data string comprising values of X and Y coordinates, and having associated with each X and Y coordinate a number of other values, commonly called Z coordinates. In the present invention, the Z coordinate may comprise not only elevational data for the particular location represented by an individual X, Y coordinate, but may also include additional data, such as data representative of a textural value for the location, or color of the location, or some other attribute such as translucence, viscosity or the like. This information may be stored in an individual data string defining each X, Y location of the gaming area 10. Alternatively, a number of separate databases may be used, with each data base linked by common X, Y coordinates identifying the location within the gaming area. Whether to store the data as one string, or as a plurality of databases linked by common X, Y coordinates is a decision for the game designer and is dependent on the storage capacity of the storage media used by the computer or gaming device, and is also limited by the amount of random access memory available in the computer. Processing speed of the computer or gaming device is also critical in that the realism of the game is determined by the rate at which visual scenes from the gaming area 10 can be displayed.

It will be apparent that the resolution of terrain details in the gaming area 10 is dependent upon the number of locations within the gaming area 10 represented by X, Y coordinates. A gaming area has higher resolution, that is, contains more detail, when the database defining the gaming area 10 contains more data points. Thus, infinite detail would require an infinite number of data points, each data point representing a particular location within the gaming area and associated with an X, Y coordinate.

To overcome this problem, and still provide sufficient resolution to provide a detailed and visually pleasing simulation, prior approaches to the rendering such visual scenes reached a compromise by rendering images having a resolution representative of the resolution of terrain features located at an intermediated distances as seen by a human eye. Because of this compromise, as an observer moves through the simulation, objects that are rendered to appear as if they were located either nearby the location of the virtual observer or at a relatively large distance from the location of the virtual observer appear unnatural.

A further description of the terrain visible to a virtual observer at viewpoint 12 is shown in FIG. 3. As can be seen in FIG. 3, not all of the gaming area 10 is visible to a virtual observer whose point of view is located at viewpoint 12, which has a particular reference point described by coordinates X, Y in the gaming area 10. As will be apparent to one skilled in the art, an observer situated at viewpoint 12 whose line of sight is indicated by line 14 is only able to view terrain features that are presented to the right of the area bounded by lines 16 and 18. The virtual observer's field of view, indicated by $\Phi$ in FIG. 2, may be any value desired by the game developer. In most simulations, however, a field of view comprising, for example, 90° is preferred because this provides a realistic field of view while not requiring inordinate amounts of processing speed or memory to render the terrain within that field of view. It will also be apparent that besides having a location indicated by coordinates X, Y, a virtual observer located at viewpoint 12 will also have an elevation relative to the terrain around him. In the simplest case, the virtual observer is located in the plane of the ground as rendered in the simulation, and thus his elevation is essentially equivalent to the elevation data associated with that particular X,Y location in the gaming area 10. In the case of an aircraft simulator, the elevation of the virtual observer can be substantially greater than the elevation of the terrain associated with location X,Y in the gaming area 10. As will be discussed further below, the elevation of the virtual observer must be taken into account when rendering the scene to provide realism.

Also shown in FIG. 3 are a series of randomly drawn lines 20–28 which serve as reference points to aid in describing the several embodiments of the present invention. These reference lines 20–28 represent locations of features which are located in the gaming area 10 at varying distances from the location of the virtual observer. While in FIG. 3, lines 20–28 appear equidistant from each adjacent line, it will be understood that the distance between he lines may vary depending on the requirements of the game. For example, and not by way of limitation, the distance between each line moving towards the right of FIG. 2 could be twice the distance of the preceding line. Thus, terrain features located along line 22 may be twice as far from viewpoint 12 as features located along line 20, and features located along line 24 may be four times as far from viewpoint 12 as features located along line 22.

As in real life, terrain features in a game simulation provides perspective to the game player. Thus, terrain features located in the plane of line 20, will appear larger than objects located along line 22, since they are closer to the viewpoint 12. Because of their apparent larger size, fewer features will be able to be rendered within the field of view bounded by lines 16 and 18 along line 20 than may be rendered along line 22. Accordingly, less stored information is required to be processed to render those features located along line 20 than is required to render features located along line 22. As the virtual observer visualizes objects further and further from his location, his field of view becomes progressively larger and more objects need to be rendered to fill the scene. At the same time, to provide the horizontal scaling necessary to provide for proper visual perspective dependent upon the distance from the observer, the relative size of each object is decreasing. However, the data required to render the scene, for example, at line 26, is substantially greater. At some point, the amount of data necessary to render objects along a line at a given distance from viewpoint 12 will exceed the processing speed of the processor and transfer rate of the bus so that further attempts to render terrain will adversely affect the rate at which the terrain can be displayed, thus slowing down the simulation and negatively affecting the performance. Accordingly, simulation developers using prior approaches to terrain rendering set an arbitrary distance for the horizon of the simulation. Because the resolution of each object was the same, objects would suddenly appear on the horizon in a so-called "jack-in-the-box affect". The appearance of large terrain features could thus prove startling and distracting to a game player.

In one embodiment of the invention, the gaming area 10 may comprise a series of data bases, with each data base optimized to provide terrain as seen by a virtual observer at a predetermined distance. Since each of these data bases are optimized to provide terrain scaled to appear as if viewed at a predetermined distance, the optimization of each data base could take advantage of the reduced need for data to provide realistic resolution of the terrain features. For example, and not by way of limitation, separate data bases could be used to render terrain features visible along each line 20, through 28. For example, while terrain features located along line 20 are closest to viewpoint 12 and thus require the highest resolution to provide a realistic visual scene, the number of features visible within the field of view bounded by lines 16 and 18 is substantially less than the number of features similarly located within the field of view along lines 22–28. However, because features located along line 28 are scaled to appear further from the virtual observer located at viewpoint 12 than features located along line 20, less resolution is required to render the features located along line 28. Accordingly, by way of example and not by way of limitation, a data base representing objects located along line 20 might require one data string for each pixel. Because of the horizontal and vertical scaling factors, one data string representing a particular location along line 28 may represent, because of the reduced need for resolution, the same information that required ten data strings for locations along line 20. Thus, it should be apparent that the data bases may be optimized to provide realistic perspective at varying distances without requiring the large amounts of data storage processing and transfer that would be required if a single data base having features at a single resolution were used to render the entire scene.

The number of data bases having differing resolutions is limited only by the number of data bases that can be stored in the computer or gaming device storage device 4 or random-access-memory 3 (FIG. 1). Preferably, the number of data bases is approximately ten, with each having approximately 75% less data than the data base representing the preceding highest resolution available.

For most purposes, while a virtual observer in a simulation needs to be able to look out towards the horizon to detect oncoming terrain features and adversaries, most events requiring operator response and input occur in relatively close proximity to the virtual observer. Thus, in a preferred embodiment, the data base representing that portion of the gaming area 10 within a pre-determined distance of the viewpoint 12 would necessarily be optimized around an intermediate resolution.

Since it is not unusual during a simulation to pass close by a feature of a terrain, such as a mountainside, use of a single database with one level of resolution may lead to visually unpleasing results. For example, as the virtual observer draws near to a particular feature of the terrain, the simulator may render the feature such that the feature takes on a blocky and unrealistic appearance. Accordingly, in another embodiment of the invention, still another database having terrain features stored at higher resolutions for viewing at close distances may be used to render the scene. As will be apparent to one skilled in the art, the additional detail required to render the close-up scene requires additional information to be stored to describe the appearance of the features located at each X and Y coordinate. A preferred approach to reducing the amount of data necessary to render such a close up visual scene is to incorporated expansion tokens into the data string. Alternatively, associated with each X and Y location can be expansion tokens. As will be discussed more fully below, during the evaluation of the terrain visible to the virtual observer given the apparent heading elevation and viewpoint of the observer, the expansion tokens provide information to the processor or the computer of the gaming device instructing the processor to access and retrieve additional data to enhance the display of the features stored at that particular location in the gaming area 10 to selectively increase the resolution of a particular feature. The features could be stored in a library of such features, for example, where the detail of a mountainside is required to provide a realistic visual scene, such detail could be provided from a library of features representative of a typical mountainside, the particular feature being selected from the library as indicated by the expansion token associated with the particular location in the gaming area 10. This library of features may be accessed by the processor 1 from the storage device 4, as required by the processor 1 to render visual scenes in response to operator input from the input device 5. Alternatively, the library of features may be loaded into the random-access-memory 3 either at the beginning of the simulation, or at some time during the simulation prior to the library being accessed by the processor 1. Pre-loading the library of features may substantially increase processing speed and thus the rendering of visual scenes in response to operator inputs from the input device 5, providing a more realistic and visually pleasing experience. By properly selecting the distance from the virtual observer that triggers the processor to select a different database to render the visual scene, the game developer may provide the game player with an apparently seamless rendering of visual scenes from very close to very distant from the virtual observer.

In an alternative embodiment of the present invention, the gaming area may also be represented by another set of data bases wherein the gaming area is divided into a number of regions called, for convenience only, quadrants. In one embodiment, a single quadrant data base is used to represent the entire gaming area. In this embodiment, the gaming area is divided into areas requiring a 10×10 block of pixels to render on a display screen. Unlike the databases described above, where a height value is associated with each pixel, in the quadrant data base, a single height value may be associated with the entire quadrant. The value of this height value may be, for example, the height of the highest feature located anywhere within the quadrant. Thus, the height of an entire 10×10 block of pixels is represented by a single value.

As will be discussed more fully below, use of quadrants speeds up the processing and rendering of the terrain data by providing a small, quickly accessible data base containing the maximum heights of all locations within a certain area. Thus, the processor need only check the height of a given quadrant to determine if any of the features in a given quadrant are visible, rather than checking the height of each individual pixel within the quadrant.

The operation of the present invention will now be described with reference to FIGS. 2–5A and 5B. The position and heading of the virtual observer 12 within the gaming area 10 are determined based on inputs from an operator. In normal game play, such inputs may be made through the pressing of keys on a keyboard or through signals received from a mouse or joystick or other input device 5. These signals are interpreted by the processor in accordance with the programming instructions of the software of the simulation program and result in the apparent motion of the virtual observer through the visual scene that is displayed on the display 18. Such signals may, for example, change the direction of movement of the observer, or may, in a flight simulation, change the apparent elevation of the virtual observer above the gaming area.

Once the position, heading and elevation of the virtual observer have been determined, that portion of the gaming area determined to be visible to the virtual observer is rendered in the display buffer 6, as will be discussed in more detail below. Once the entire scene is rendered and stored in the display buffer 6, the contents of the display buffer 6 are written to the display 18. This process is repeated as often as necessary to provide a flow of images on the display 18 that provide for a pleasing and realistic simulation.

FIG. 3 depicts an exemplary image rendered on the display screen 18 by the present invention as viewed by an operator at a given instant of simulation or game play. Three horizon lines identified as $c_1$, $c_2$, and $c_n$ representing a sequence of terrain features visible to a virtual observer are illustrated. It should be appreciated that the screen dimensions given are selected merely for purposes of illustration of the invention, and are nowise limiting. The horizon lines $c_1$, $c_2$, and $c_n$ represent various topographical features, as they might appear on the display screen 18, according to the data stored in the visual data base 10.

Figure 4:
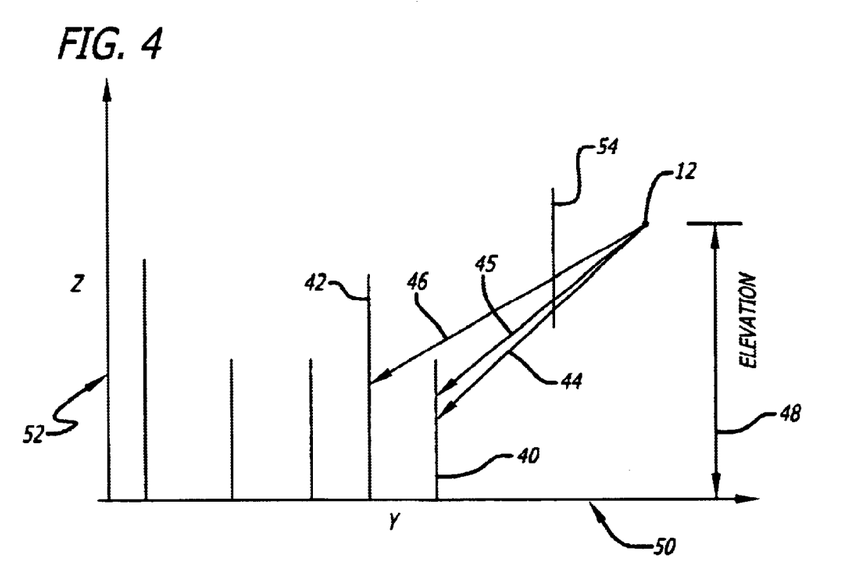
FIG. 4 is a cross-sectional view of the gaming area of FIG. 3 taken along the line 4—4.

In a preferred embodiment, the visual scene is rendered by the processor 1 by iteratively generating each pixel of the visual scene by beginning with the pixel located at the bottom left of the display screen 18, identified in FIG. 3 by the array coordinates (0,200). A cross-section of the display 18 screen in FIG. 3 is represented in FIG. 4 by the line 54. This line 54 is representative of the first column of pixels on the left side of the display screen as viewed by a game player.

Once the position, heading and elevation 48 of the observer have been determined by the processor 1, the visual scene is rendered by first calculating a three dimensional step vector that describes the view of the observer passing through a single pixel, in this example, the pixel of the display identified as pixel (0,200). As will be obvious to one skilled in the art, this step vector 44 can be calculated to describe the line originating at the viewpoint 12 and passing through pixel (0, 200). Once this vector is determined, the process can then calculate the extension of the vector to determine if the vector intersects any feature of the terrain of the gaming area 10 that may be visible to the virtual observer located at viewpoint 12. In one embodiment of the invention, when vector 44 encounters a terrain feature that would be visible, the height of the feature 40 is stored in a memory buffer for later reference. For example, once a feature is determined to be visible, a line is drawn, the length of the line being a scaled height determined from the Z component of the vector 44 scaled to account for the elevation 48 of the virtual observer and the distance from the viewpoint 12 to the feature 40. Once this line is drawn, the next y coordinate of the step vector is incremented and vector 45 is calculated. In one embodiment, the height of feature 40 has been stored in a buffer, typically a portion of the random-access-memory 3, although the buffer may also be located in cache memory associated with the processor 1, or in a file on the storage device 4, and is thus available to the processor to compare to the scaled height of the feature as determined from vector 45. As can be seen from FIG. 2, the calculation of vector 45 is not necessary, because its calculation will not render any further features of the gaming area 10 than were rendered with the calculation of vector 44. Thus, a substantial improvement in overall processing speed is obtained using the present invention because the processor 1, taking into account the stored value of the height of feature 40, calculates the next incremental step vector to define vector 46, rather than vector 45 or any other intermediate vectors, since the vectors passing through those pixels on the display screen 18 will add no further detail. This process is continued for each pixel on the display screen until the entire first column of the display has been rendered. The process is then repeated for the next column of the display screen.

Alternatively, the X coordinate may be iterated, rendering an entire row of the display screen. In that embodiment, the display would be rendered by generating the display beginning with the bottom row of the display screen 18, which represents the gaming area closest to the virtual observer, and then generating each subsequent row until the entire visual scene is rendered in the display buffer 6, the last row representing the area of the gaming area visible to the virtual observer that is farthest away from the virtual observer.

Figures 5A, 5B:
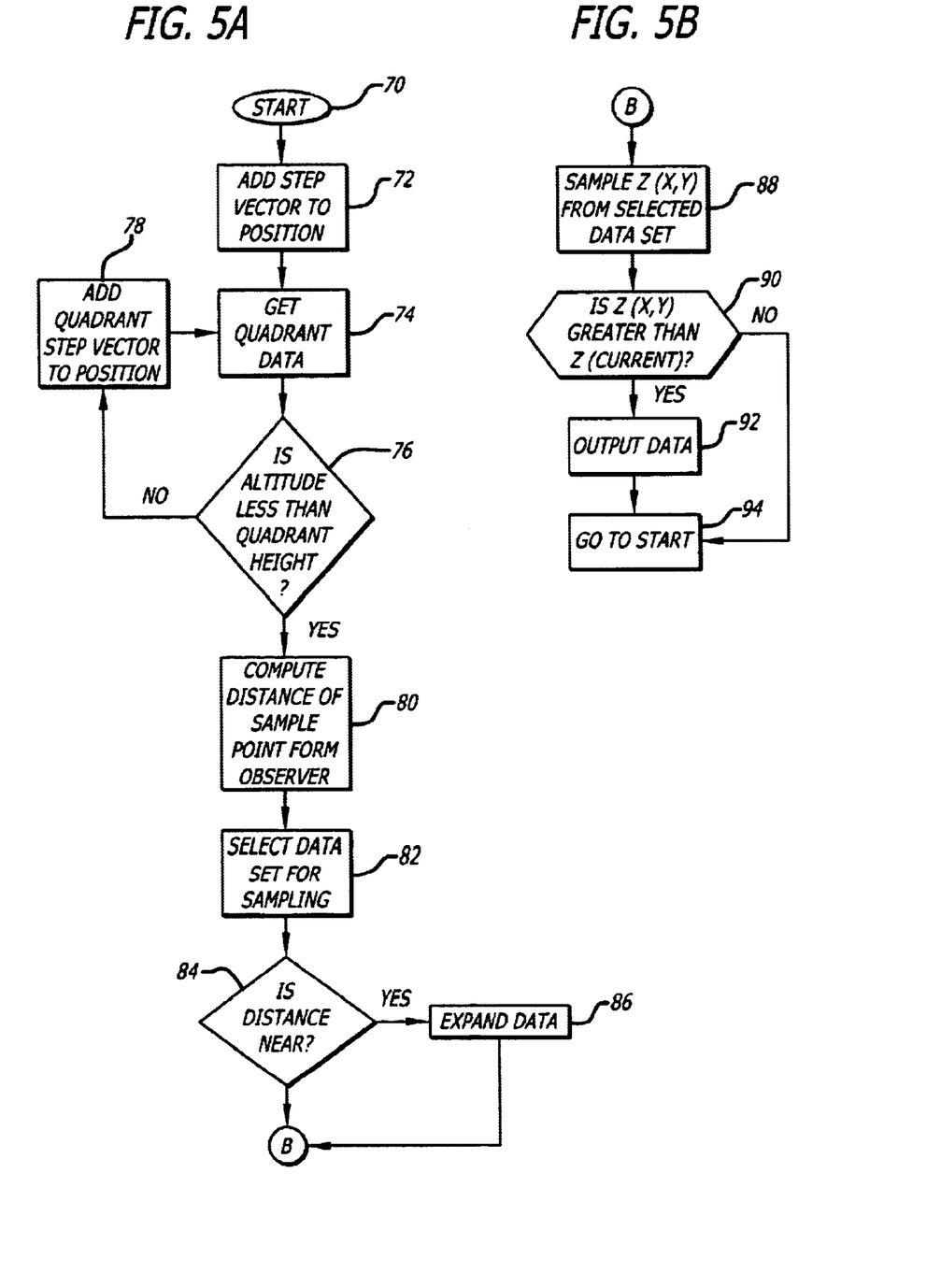
FIGS. 5A and 5B are block diagrams of an image generator to render a scene using voxels.

With this background established, the technique of the present invention may be described alternatively as follows. FIGS. 5A and 5B are flow charts representative of the technique of the present invention. Reference may also be taken to the following table (Table I) which represents summarily the process which is explained below.

TABLE I

PROGRAM OPERATIONS

| | |
|---|---|
| A | Allocate memory for data. |
| B | Load data into memory. |
| C | Clear the screen buffer. |
| D | Get observer position and heading. |
| E | Add step vector to Observer position |
| F | Get quadrant data |
| G | Determine if the altitude of the observer is less than the quadrant height |
| H | If altitude is less, compute distance of sample point from the observer; else add quadrant step vector to position and repeat from step F |
| I | Select data set for sampling |
| J | If the sample point is close to the virtual observer, expand the data |
| K | Sample the height data of the selected data set |
| L | If the height is greater than the height of the last feature drawn, output data to an accelerator card or display buffer |
| M | Repeat from step E until all the visual scene is rendered in the buffer |
| N | Write the display buffer to the display |

As before, the processor renders the visual scene by computing the position, heading and elevation of the virtual observer relative to the gaming area 10. The first step vector is computed, and added to the observers position, as indicated in box 72. Retrieving the height data in box 74 from the quadrant within which the pixel to be generated as determined in box 72 lies, the processor 1 next determines whether there is any feature within the quadrant that would be visible as viewed along the step vector determined in step 72. If the processor 1 determines that no feature is visible within the quadrant, the program branches to box 78. In box 78, a quadrant step vector is calculated. This vector is different from the step vector in that the quadrant vector moves incrementally across quadrants, while the step vector iterates across pixels. Thus, in box 78, the calculated quadrant step vector is added to the position of the virtual observer. Because the quadrant step vector translates the vector over a much larger distance than the step vector, the same amount of terrain can be generated using substantially fewer steps, thus resulting in a substantial improvement in processing speed.

If there is a terrain feature visible as determined in box 76, the distance of the sample point, or the point where the vector 44 intersects the gaming area, from the virtual observer is calculated in box 80. This distance is used by the processor to select an appropriate data base wherein the elevation data contained in the data base representing the height of features of the gaming area 10 has been scaled to be representative of the scaling caused by the distance of the feature from an observer. Since this data is already scaled for distance, additional improvements in processing speed are obtained because overdrawing of lines previously rendered is minimized. In a preferred embodiment, the number of databases, each having sequentially less resolution, is limited only by the available capacity of the storage device 4 or the random-access-memory 3 of the system. For example, a series of data bases beginning with a database representing a large area of the gaming area and ending with a data base representing only a small area of the gaming area wherein the height of any feature of the gaming area 10 can be represented by a single pixel could be used. For example, a series of ten databases, each database representing a smaller gaming area at higher resolution than the previous databases could be used.

Alternatively, the processor 1 may determine that the distance of the sample point from the virtual observer is sufficiently small such that even using the data base having the highest resolution, a pleasing visual display cannot be obtained. If this is the case, the processor may expand the data available in the data base using expansion tokens that are stored within the data base and are associated with each location in the data base. As stated previously, these expansion tokens can be used to provide additional resolution in the visual display for the locations close to the virtual observer. In a preferred embodiment, the expansion token is used as a pointer to a table of features or portions of features stored in the storage device 4 or the random-access-memory 3 having a higher resolution than exists in the currently selected data base. Thus, the table of features could contain a close up of the side of a mountain, or a bush, or a landing strip. The processor 1 may then render this feature pixel by pixel, as for all the other terrain features. In the preferred embodiment, the feature may be mapped by the processor 1 into the display buffer 6 so that the feature is rendered at the location of the gaming area determined from the virtual observer's position, heading and elevation. Such mapping provides additional resolution without requiring a large increase in processing steps to render that portion of the visual scene close to the virtual observer. The expanded data may also be stored in a buffer located in the random-access memory 3 or the storage device 4 for future reference by the processor in further scene rendering, thus saving additional processing steps that would be needed to re-render the expanded data.

Once expansion of the data base is completed, or if expansion is not necessary, as determined in box 84, the height of the feature as a function of (X, Y) steps is sampled in box 88. If the sampled height is greater than the height of the feature that is stored in the buffer described above, data is output in box 92. Depending on the embodiment of the invention, a line is drawn in the display buffer representing the scaled height of the feature at that particular location as viewed by the virtual observer or the data is output to an accelerator card for further processing, as is described below.

If the sampled height is not greater than the stored height, then data will not be outputted, or the line not drawn, because the data would simply represent the case where the computed line would simply overdraw a line previously drawn. By preventing the overdrawing of lines, a substantial gain in processing speed is obtained. If the line is not drawn, or data is not outputted, the processes returns to box 70 and is repeated until the entire visual scene is rendered in the display buffer, and the contents of the display buffer are written to the display.

The method described above is useful for generating visual scenes on a display using the computing power of the processor 1 (FIG. 1) more efficiently than may be achieved with polygon constructions. However, recent advances in hardware and software have made available dedicated hardware known as graphic accelerator cards. These cards, comprising random access memory and dedicated processors separate from the RAM memory and processor of the as general computer, are more efficient in generating the mathematical tables of vertices and triangles necessary to use polygons to provide highly detailed scenes. The computational speeds of these cards are typically great enough to allow complex scenes consisting of large numbers of polygons to be rapidly rendered in real time.

One advantage of generating scenes containing elevational information using voxels as described above is that the information output by the terrain generator described in FIGS. 5A and 5B may be altered for use as input for an accelerator card. For example, as described above, information describing the location, elevation and color of a particular pixel may be generated using information from an elevational data base. One embodiment of the present invention provides for generating the pixels comprising the scene to be displayed as described above, but, rather than writing out a color pixel to a buffer to be displayed, writing out the two dimensional, or X, Y coordinate of the pixel on a color map that has been loaded into the memory of the accelerator card, and write out the distance of the pixel from the observer, which is the same as the coordinate of the row of pixels generating the pixel, adjusted for angle of the pixel to the observer, to the z buffer of the card. This information may then be used to compute a list of vertices and triangles that may be used by the accelerator card to render the scene. This process is beneficial because it allows the separation of high detail and volume element resolution calculations. Because the color or texture map may be highly detailed, the resolution of the volume element, or voxel, generated scene may have a lower resolution than would be necessary to provide a pleasing visual scene if voxels alone were used to render the scene. Moreover, because the method used to generate the two dimensional coordinates of the pixels and the depth of the pixel from the observer inherently renders a scene without overdrawing pixels, various algorithms normally applied to pixels rendered by a polygon engine are not necessary, thus decreasing the number of computations steps necessary to render a given scene.

The simplest form of polygons is the triangle, a shape that has three vertices. In a polygon system, each object is partitioned into a plurality of non-overlapping triangles. Triangles are particularly easy to scan and use for computation since parameter slopes may be constant across the triangle. Moreover, techniques for partitioning polygons into triangles and for performing various interpolations are well known in the art, and will not be described here. Providing the X,Y coordinate of a pixel, along with a parameter, such as the depth of the pixel from an observer, the color of the pixel or texture to be mapped to the pixel provides the information necessary for a graphic accelerator card to rapidly compute and output a scene to a display.

Figure 6:
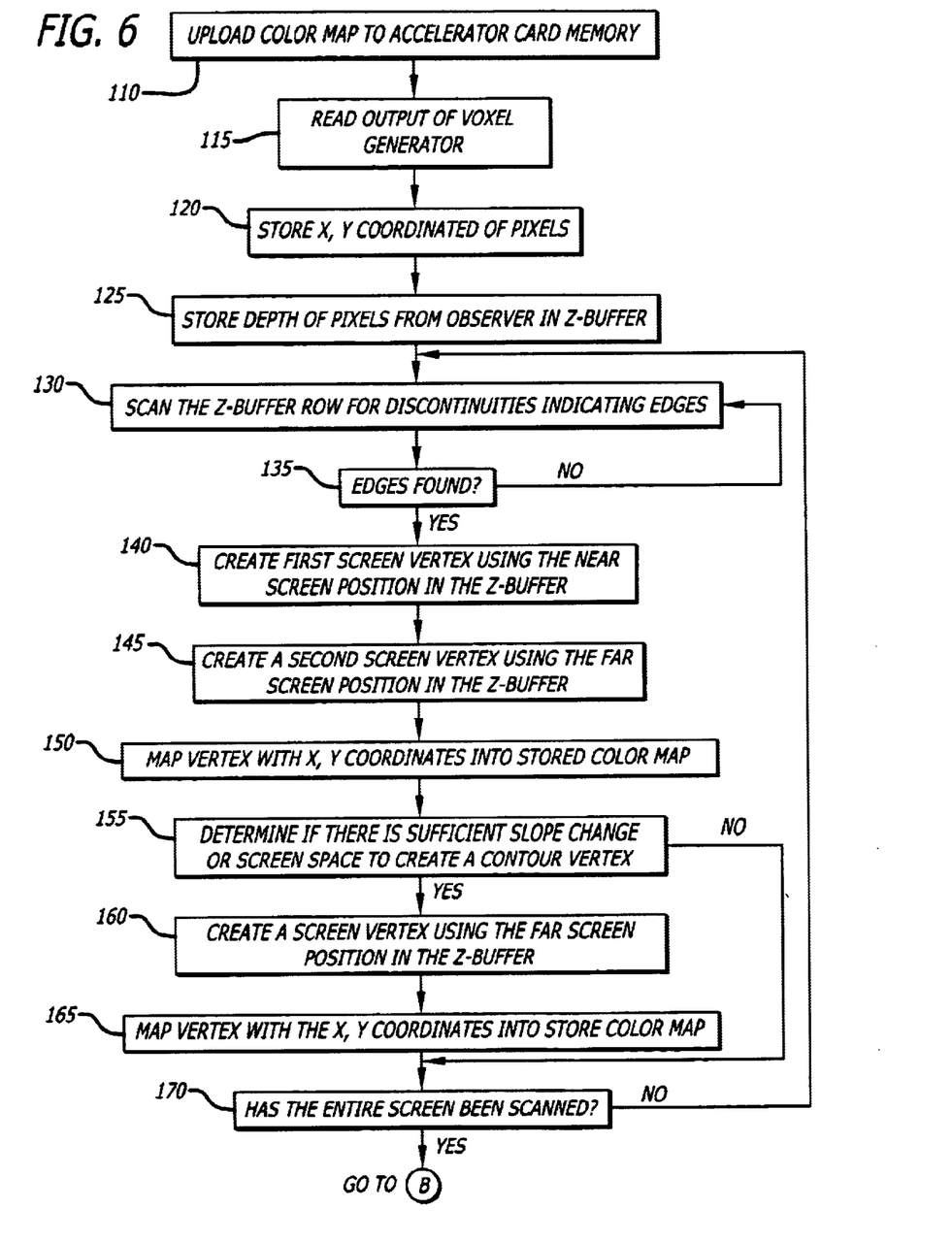
FIG. 6 is a block diagram of a process of the present invention for using the data generated by the image generator of FIGS. 5A and 5B to generate a vertex list that is input into a graphic accelerator card.

FIG. 6 illustrates the method of one embodiment of the present invention wherein a visual scene may be rendered using a volume element generator followed by application of color, depth and texture using the memory and processor of an accelerator card to render the outputted display. In box 110, a color map is loaded into the memory of the accelerator card. This memory may be a particular RAM memory, or it may be a portion of an already allocated buffer.

The data generated by the voxel generator described in FIGS. 5A and 5B is then output to and read by the accelerator card in box 115, which then stores the X,Y coordinates of each rendered pixel in a buffer or other memory associated with the accelerator card in box 120. The depth of each pixel from the observer is stored in the Z-buffer of the accelerator card in box 125.

Figure 8:
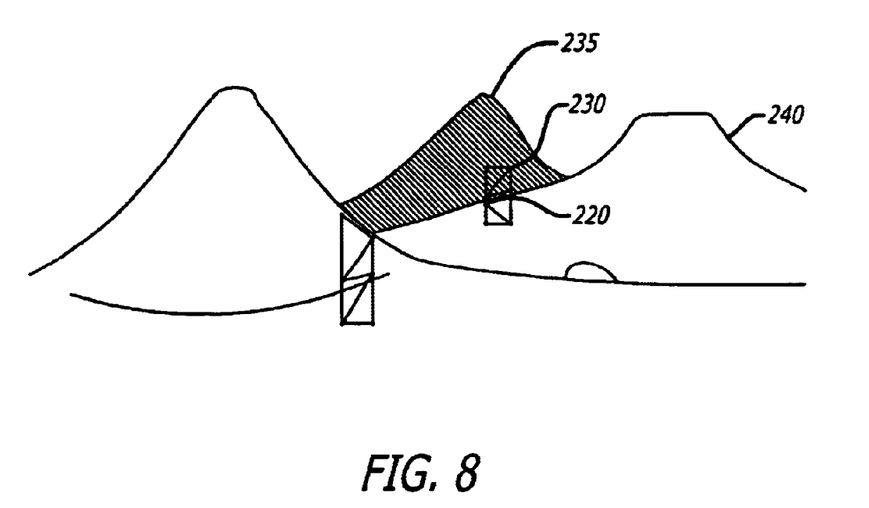
FIG. 8 is a graphical representation illustrating how the process of FIGS. 7 and 8 generate and optimize vertex data and triangle date for input into the graphic accelerator card.

The processor of the accelerator card, in box 130, then begins scanning the Z-buffer row by row, analyzing the data stored therein to detect discontinuities or rapid changes in slope that may indicate an edge of a polygon. An example of such discontinuities or changes in slope is illustrated in FIG. 8. The difference between the slope of polygons having vertices 220 and 230 indicate that there is an edge, or discontinuity, bounding the features 235 and 240.

If an edge is found, the processor uses the nearest screen position to the observer in the Z-buffer and creates a first screen vertex in box 140. The processor then creates a second screen vertex using the far screen position in the Z-buffer in box 145. Once these two screen vertices are created, the vertices are mapped onto the color map in box 150. The processor then further analyzes the data to determine if there is sufficient slope change or screen position to create a contour vertex in box 155. If there is sufficient slope change or screen space, the processor creates a screen vertex using the far screen position associated with the pixels in the Z-buffer in box 160. The screen vertex of the contour is then mapped into the stored color map in box 165. Once this process is completed, the processor determines whether the entire screen to be displayed has been scanned in box 170. If the entire screen has not be scanned, then the processor returns to box 130, scans the next row of the Z-buffer, and repeats the processes of boxes 130 to 170. If the entire screen has been scanned, the program begins the process identified by B in FIG. 7.

Figure 7:
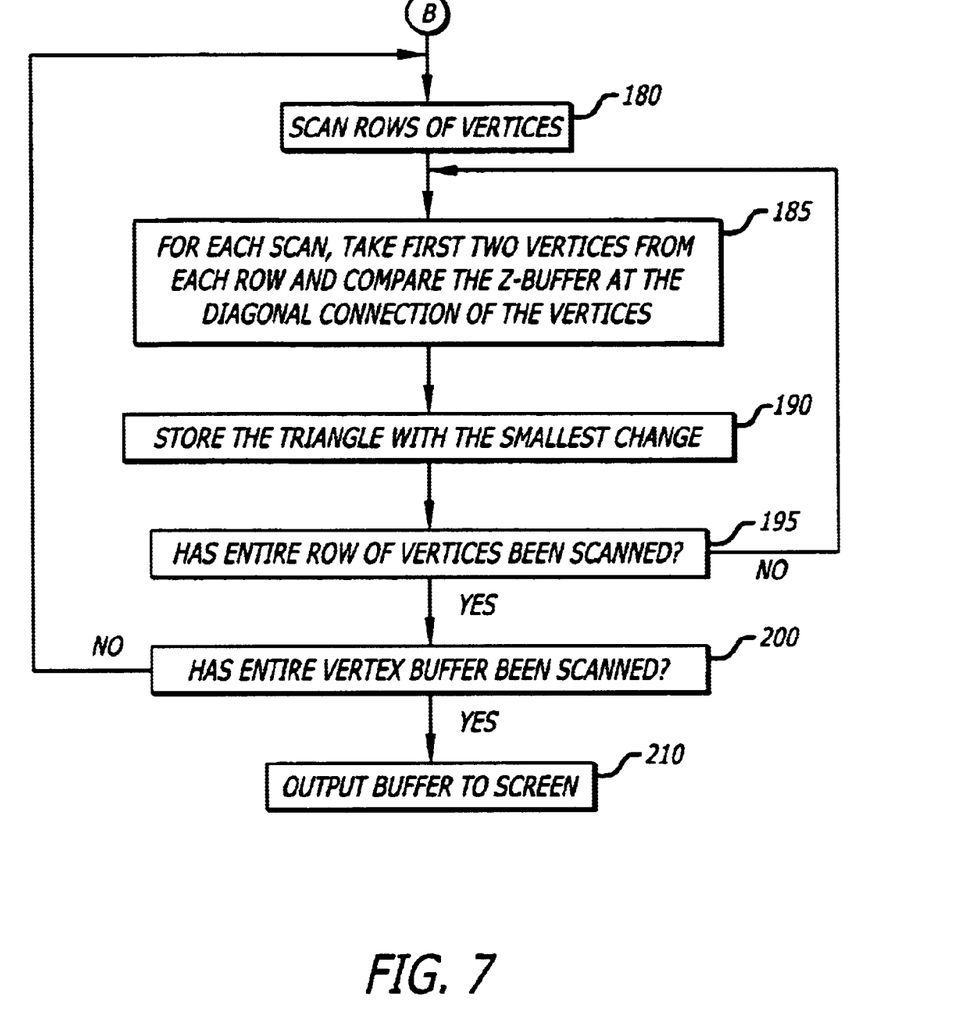
FIG. 7 is a block diagram of a process of the present invention for generating a triangle list from the vertex list generated by the process of FIG. 6 for input into the graphic accelerator card.

The process depicted in the block diagram of FIG. 7 generates the list of triangles that is used by the accelerator card to render the visual scene. Beginning with box 180, the processor of the accelerator card scans the rows of vertices generated by the processes of FIG. 6. The rows of vertices are scanned two rows at a time, taking the first two vertices from each row and comparing the values associated with the diagonal connection of the vertices that are contained in the Z-buffer. Thus, the process analyzes the triangles of the polygon structures to determine which of the two triangles has the smallest change, that is, the triangle that is most likely to fit the underlying terrain, and stores the smallest triangle in a buffer in box 190. This process is repeated for each pair of vertices until the entire row has been scanned, as indicated by box 195. Once the entire row has been scanned, the processor determines if the entire vertex buffer has been scanned in box 200. If the entire vertex buffer has not been scanned, then the program branches back to box 180 and scans the next pair of rows of the vertex buffer. If the entire vertex buffer has been scanned, the processor of the accelerator card, in box 210, outputs the contents of the buffer to the screen to render the scene.

In another embodiment of the present invention, performance of the system may be improved by generating the vertex list by the voxel generator. This process saves a memory copy step, and eliminates the need to create the two dimensional X,Y coordinate and Z-buffers. Moreover, in another embodiment of the present invention, the triangle calculation may be improved by applying a fuzzy logic to the analysis of the change in Z-buffer value. This may be accomplished by estimating what the smallest change in Z would be if a particular choice in diagonal were made. For example, the diagonal Z could be weighted with the next best diagonal Z that would occur if the next best diagonal were chosen.

It should be appreciated that the invention may be easily implemented in either software or hardware. Other modifications to the hardware or software can be made to the present invention without departing from the spirit and scope thereof. Accordingly, it is not intended that the invention be limited except by the appended claims.

I claim:

1. A method of generating a perspective visual scene, comprising the steps of:

a) determining the position of an observer in relation to a gaming area bounded by the observer's field of view;

b) incrementing the observer's position by one unit;

c) determining if the data quadrant at the new position is visible to the observer, wherein if the data quadrant is not visible, incrementing a quadrant step vector;

d) determining a distance from the observer to an object of interest;

e) selecting a database to be used dependent on the distance from the observer to the object of interest;

f) sampling the height data at the current position;

g) comparing the height data at the current position with the current elevation;

h) outputting data representing the location of a pixel located at the current position and storing the outputted date in a coordinate buffer;

j) storing the distance of the pixel from the observer in a Z-buffer;

k) scanning the first row of the Z-buffer to determine if there is an edge;

l) if an edge is found, creating a first screen vertex using a near screen position in the Z-buffer and creating a second screen vertex using a far screen position in the Z-buffer;

m) mapping the first and second screen vertices into a stored color map and storing the mapped vertices in a vertex buffer;

n) determining if there is a slope change exceeding a predetermined value to create a contour vertex;

o) creating a screen vertex, if the slope change exceeds the predetermined value, using the far screen position in the Z-buffer and mapping the screen vertex into the stored color map and storing the mapped vertex in the vertex buffer p) determining if the entire screen has been scanned, and if not, repeating steps k through o until the entire screen has been scanned;

q) scanning the first two rows of the vertex buffer and comparing the first two vertices in each row at the diagonal connection of the vertices to determine which triangle formed by the vertices has the smallest change in slope and storing the triangle with the smallest change in slope;

r) repeating step q until the entire row of vertices have been compared;

s) incrementing the rows of the vertex buffer that are scanned and repeating steps q through r until the entire vertex buffer has been scanned and triangles stored for each comparison of vertices; and t) displaying the visual scene on a display device.

2. A method for rendering a visual scene, comprising:

a) determining a set of data representing the location and height of a plurality of pixels representing an object of interest, the set of data determined from positional data, distance data representing the distance of the object of interest from an observer, elevational data of the object of interest, and color data;

b) storing the data in a data buffer;

c) scanning the buffer to determine if edges exist;

d) creating a set of vertex data from the data stored in the buffer, and a color map and storing the set of vertex data in a vertex buffer;

e) scanning selected pairs of vertices of the set of vertex data stored in the vertex buffer and determining a triangle having the smallest slope change associated with the selected pair of vertices and storing the determined triangle in a triangle buffer;

f) rendering a visual scene on a display device from the data stored in the vertex buffer and the triangle buffer.

3. The method of claim 2, wherein determining a triangle further comprises:

determining a set of diagonals connecting a selected pair of values of vertex data;

determining a best diagonal from the set of diagonals connecting the selected pair of values of vertex data having the least slope change;

weighting the best diagonal with a value calculated from the slope of the next best diagonal of the set of diagonals.

* * * * *

UNITED STATES PATENT AND TRADEMARK OFFICE
CERTIFICATE OF CORRECTION

PATENT NO. : 6,700,573 B2
DATED : March 2, 2004
INVENTOR(S) : Kyle G. Freeman

It is certified that error appears in the above-identified patent and that said Letters Patent is hereby corrected as shown below:

Column 2,
Line 9, delete "he" and insert -- the --.

Column 7,
Line 39, delete "he" and insert -- the --.

Column 9,
Line 10, delete "incorporated" and insert -- incorporate --.

Column 15,
Line 46, delete "date" and insert -- data --.

Signed and Sealed this

Twenty-fourth Day of August, 2004

JON W. DUDAS
*Director of the United States Patent and Trademark Office*